United States Patent
West et al.

(10) Patent No.: US 9,446,731 B1
(45) Date of Patent: Sep. 20, 2016

(54) INFLATABLE CHAMBER INTEGRATED INTO CENTER FLOOR CONSOLE

(71) Applicant: Ford Global Technologies, LLC, Dearborn, MI (US)

(72) Inventors: Sean Bayle West, Monroe, MI (US); Stacey H. Raines, Ypsilanti, MI (US); Benjamin Yilma, Canton, MI (US); Nicholas Andrew Mazzocchi, Ann Arbor, MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/701,582

(22) Filed: May 1, 2015

(51) Int. Cl.
*B60R 21/20* (2011.01)
*B60R 21/215* (2011.01)
*B60R 21/231* (2011.01)

(52) U.S. Cl.
CPC ............. *B60R 21/20* (2013.01); *B60R 21/215* (2013.01); *B60R 21/231* (2013.01); *B60R 2021/23153* (2013.01); *B60R 2021/23169* (2013.01)

(58) Field of Classification Search
CPC ... B60R 21/20; B60R 21/045; B60R 21/215; B60R 21/231; B60R 2021/23153; B60R 2021/23169; B60R 2021/23161; B60R 2021/0213; B60R 2021/0293
See application file for complete search history.

(56) References Cited

U.S. PATENT DOCUMENTS

| | | | | |
|---|---|---|---|---|
| 5,222,761 A | * | 6/1993 | Kaji | B60R 21/017 280/730.2 |
| 5,312,131 A | * | 5/1994 | Kitagawa | B60R 21/206 280/728.1 |
| 5,931,493 A | * | 8/1999 | Sutherland | B60R 21/215 280/730.1 |
| 6,142,521 A | * | 11/2000 | Shephard | B60R 19/00 280/728.1 |
| 6,688,643 B2 | * | 2/2004 | Schneider | B60R 21/206 280/728.3 |
| 8,210,566 B2 | * | 7/2012 | Fukawatase | B60R 21/231 280/728.3 |
| 9,283,916 B2 | * | 3/2016 | Nagasawa | B60R 21/231 |
| 2002/0121770 A1 | * | 9/2002 | Schneider | B60R 21/206 280/732 |
| 2005/0098996 A1 | * | 5/2005 | Enders | B60R 21/2165 280/751 |
| 2007/0200320 A1 | * | 8/2007 | Keshavaraj | B60R 21/206 280/730.1 |
| 2009/0001695 A1 | | 1/2009 | Suzuki et al. | |
| 2010/0090491 A1 | * | 4/2010 | Hipshier | B60R 7/04 296/24.34 |
| 2010/0194081 A1 | * | 8/2010 | Thomas | B60R 21/16 280/730.1 |
| 2011/0278826 A1 | * | 11/2011 | Fukawatase | B60R 21/231 280/730.2 |
| 2015/0061268 A1 | * | 3/2015 | Nagasawa | B60R 21/231 280/730.1 |
| 2015/0251606 A1 | * | 9/2015 | Murray | B60R 7/04 296/37.1 |

FOREIGN PATENT DOCUMENTS

| | | |
|---|---|---|
| KR | 20050029833 | 3/2005 |
| KR | 20050075599 | 7/2005 |
| KR | 20070052549 | 5/2007 |

\* cited by examiner

*Primary Examiner* — Drew Brown
(74) *Attorney, Agent, or Firm* — Frank A. MacKenzie; Bejin Bieneman PLC (57) ABSTRACT

A vehicle console includes a frame and an impact absorbing device supported on the frame. The impact absorbing device includes a bladder connected to the frame and a panel connected to the bladder. The bladder and the panel define an inflation chamber between the bladder and the panel. The panel is rigid relative to the bladder. An inflator is in communication with the inflation chamber.

19 Claims, 10 Drawing Sheets

INFLATABLE CHAMBER INTEGRATED INTO CENTER FLOOR CONSOLE

BACKGROUND

Vehicles include various restraint systems for restraining occupants during a vehicle impact and energy absorbing systems for absorbing energy from the occupants during the vehicle impact. During a frontal impact, the occupants of the vehicle may be urged forward. For example, occupants in a second row of seats may move forward and impact front seats of the vehicle. However, the vehicle may include a console disposed between the front seats. During a frontal impact of the vehicle, the occupants in the second row of seats may move toward the console and the legs, feet, angles, and/or knees of the occupant may impact the console. Accordingly, there remains an opportunity to absorb energy from occupants moving toward the console during a frontal impact.

DETAILED DESCRIPTION

With reference to the Figures, wherein like numerals indicate like parts throughout the several views, a vehicle console 14 includes a frame 30 and an impact absorbing device 10 supported on the frame 30. The impact absorbing device 10 includes a bladder 21 connected to the frame and a panel 16 connected to the bladder 21. The panel 16 and the bladder 21 define an inflation chamber 18 between the panel 16 and the bladder 21. The panel 16 is rigid relative to the bladder 21. An inflator 20 is in communication with the inflation chamber 18.

Figure 2:
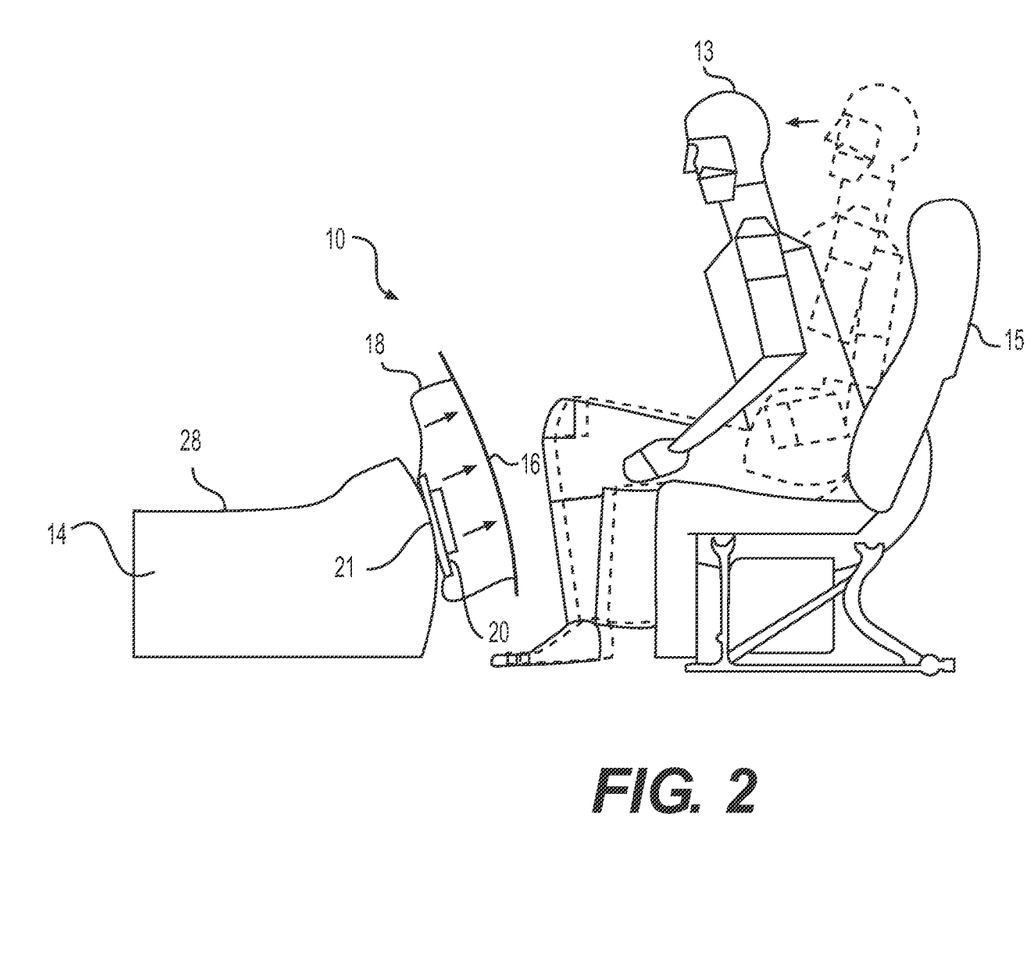
FIG. 2 is a side view of the console with the impact absorbing device in a deployed position.

In the event of a rapid deceleration of the vehicle, such as a frontal impact, an occupant, as shown in FIG. 2, may tend to move forward. In such a situation, the impact absorbing device 10 may be deployed to absorb energy from the occupant to prevent or limit impact between the occupant and the frame 30. Specifically, in such a situation, the inflator 21 may inflate the inflation chamber 18 to move the panel 16 toward the occupant, as shown in FIG. 2, and the inflated inflation chamber 18 may absorb energy from the knees, legs, ankles, and/or feet of the occupant.

Specifically, the inflator 21 inflates the inflation chamber 18 from a stowed position, as shown in FIGS. 1, 3A-3C and 6B, to an extended position, as shown in FIGS. 2, 4A-6A, and 6C. As set forth further below, the bladder 21 and the panel 16 may be configured to move away from the frame 30 from the stowed position to the extended position.

The vehicle may include an impact sensing system 62, as described further below, configured detect an impact and instruct the inflator 20 to inflate the inflation chamber 18. The inflation of the inflation chamber 18 pushes the panel 16 along with the expanding inflation chamber towards the occupant 13 in the extended position. The occupant 13 may contact the panel 16 and/or the bladder 21, which may absorb energy from the occupant 13.

Figure 1:
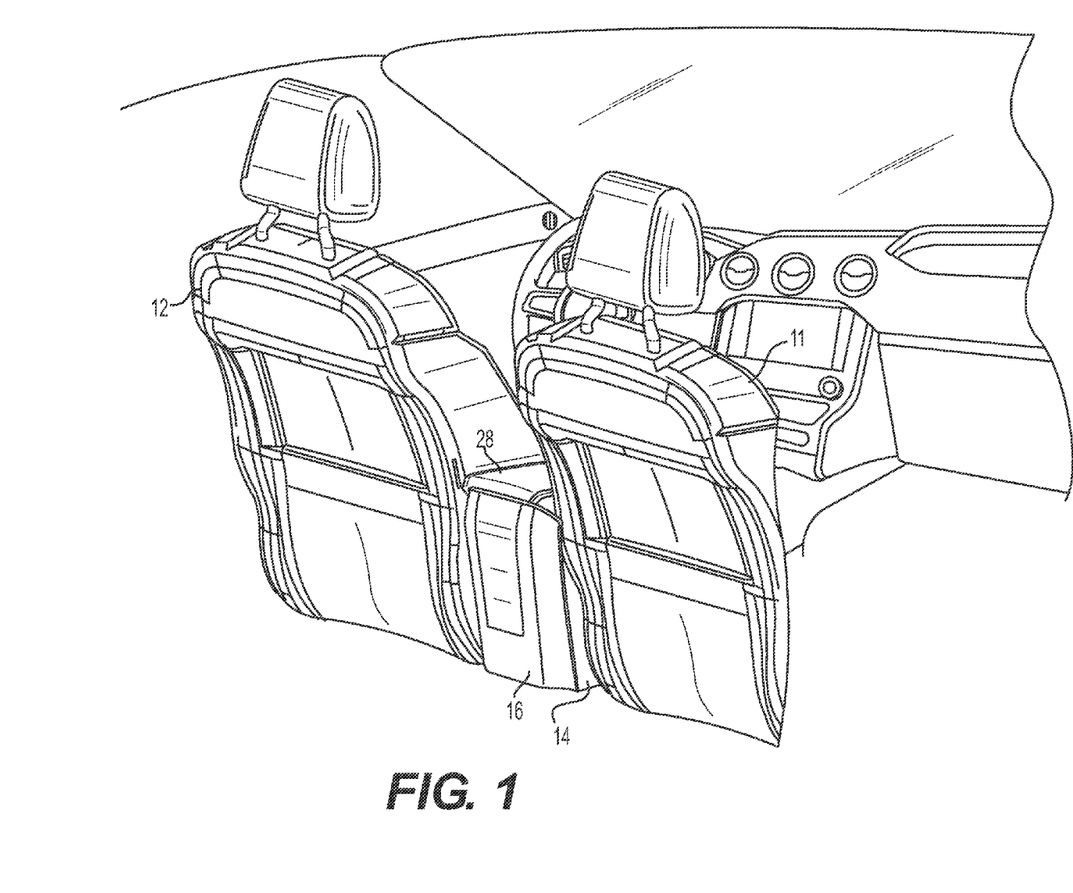
FIG. 1 is a perspective view of a console between front seats of a vehicle including an impact and an absorbing device in a stowed position.

As shown in FIG. 1, the vehicle may include a front right seat 11, e.g., a driver seat, and a left front seat 12, e.g., a passenger seat. The console 14 interposed between the right front seat 11 and the left front seat 12. The console 14 may, for example, be fixed to a floor (not numbered) of the vehicle.

The console 14 may include a top 28 pivotally connected to the frame 30 to removably cover a compartment (not shown) below the top 28. The console 14 may include trim pieces (not numbered). The panel 16, the top 28, and the trim pieces may be formed of the same type of material or of different types of material and may be connected to the frame 30 and/or each other in any suitable fashion. The panel 16, the top 28, and/or the trim pieces may present as a class-A surface, i.e., a surface specifically manufactured to have a high quality, finished aesthetic appearance free of blemishes. The class-A surface may have any suitable surface texture.

With reference to FIG. 2, the vehicle may include a second row of seats disposed behind the right front seat 11 and the left front seat 12. The second row of seats may include any suitable number of seats, and may include individual seats and/or a bench seat. As shown in FIG. 2, an occupant of the second row of seats, e.g., a center seat disposed directly behind the console 14, may move forward during an impact to engage the impact absorbing device.

The panel 16 may conceal the bladder when the impact absorbing device 10 is in the stowed position. When in the stowed position, the panel 16 may be substantially flush, i.e., have level surfaces, with the rest of the console 14, e.g., trim pieces of the console.

As set forth above, the panel 16 may be rigid relative to the bladder 21. In other words, the bladder 21 may be flexible relative to the panel 16 and may expand when the inflation chamber 18 is inflated by the inflator 20. The bladder 21 may expand by unfolding and/or by stretching. The bladder 21 may be thinner than the panel 16 in the stowed position. The bladder 21 may include a base (not shown) of increased thickness for mounting to the frame 30. This base may be formed of the same type of material as or a different type of material than the rest of the bladder 21.

The panel 16 and the bladder 21 may be integrally formed i.e., formed simultaneously as a single unit. Alternatively, the panel 16 and the bladder 21 may be formed separately and subsequently fixed to each other by adhesive, fusing, welding, melting, fasteners, etc. The panel 16 and/or the bladder 21 may be formed separately or simultaneously by blow molding. As another example, the panel 16 and/or the bladder 21 may be formed separately or simultaneously by injection molding. In any event, the panel 16 and the bladder 21 may be hermetically sealed.

The bladder 21 and the panel 16 may be formed of the same type of material or of different types of material. For example, the bladder and/or the panel 16 may be formed of silicon, nylon, plastic, vinyl and/or any other suitable material.

The bladder 21 may have a uniform thickness, as shown in the Figures. Alternatively, the bladder 21 may have a varying thickness.

The inflator 20 is configured to inflate the inflation chamber 18 to move the panel 16 away from the frame 30 from the stowed position to the extended position. Specifically, the inflator 20 may introduce inflation gas into the inflation chamber 18 to inflate the inflation chamber 18. The inflator 20 may be a pyrotechnic inflator, a hybrid inflator, a cold-gas inflator or may be of any suitable type.

Figure 3A:
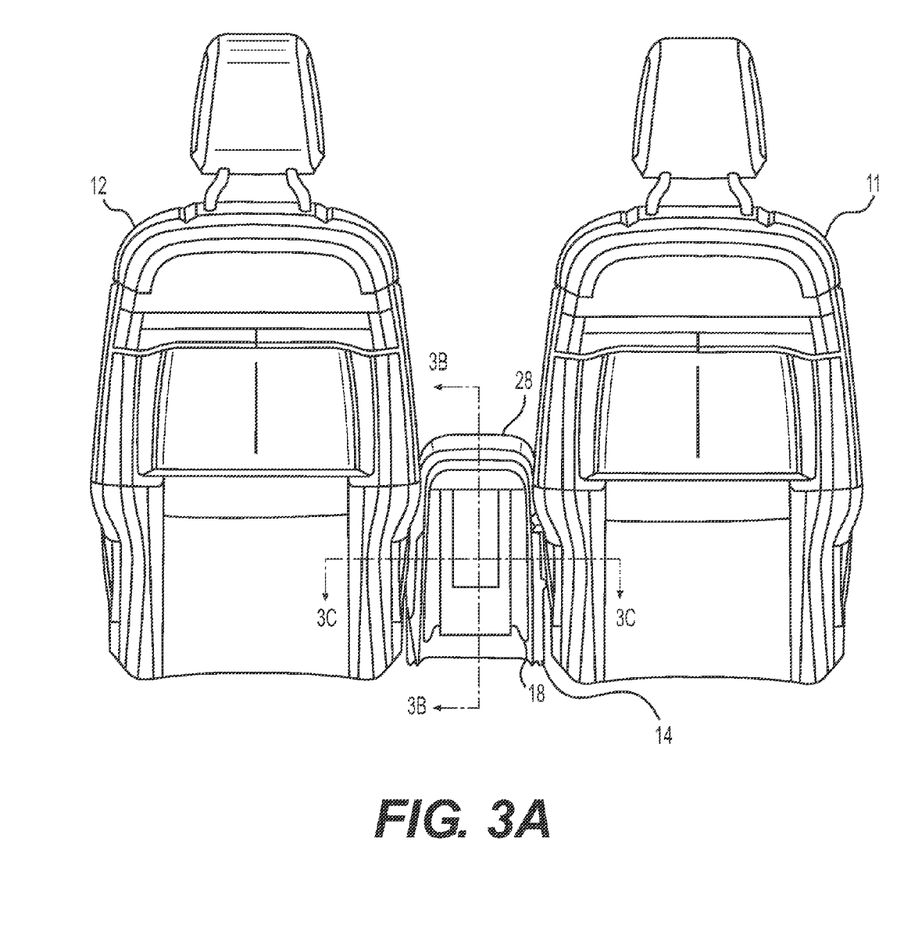
FIG. 3A is a rear view of the impact absorbing device in the stowed position.
Figure 3B:
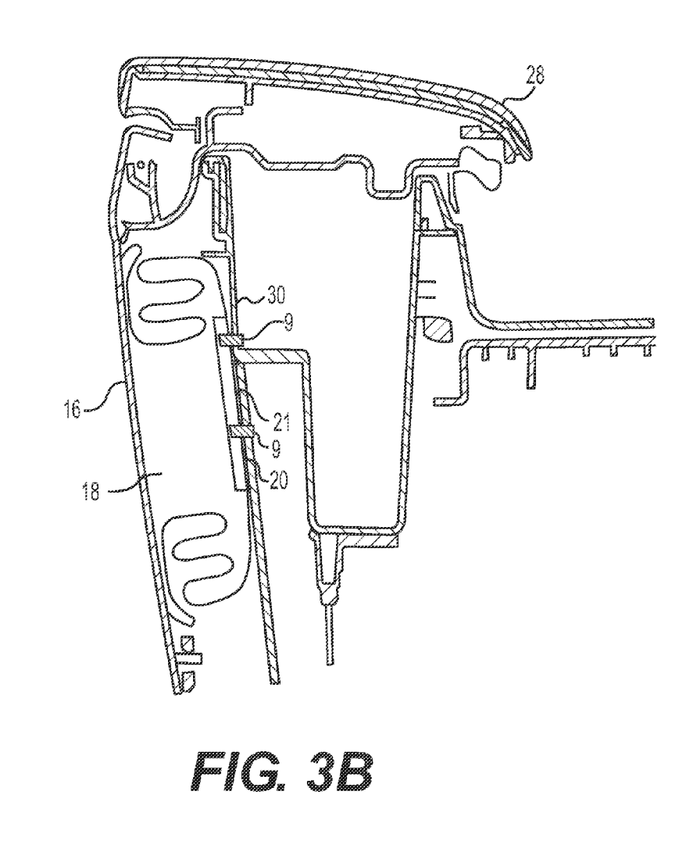
FIG. 3B is a cross-sectional view of the console with the impact absorbing device in the stowed position along line 3B of FIG. 3A.
Figure 4A:
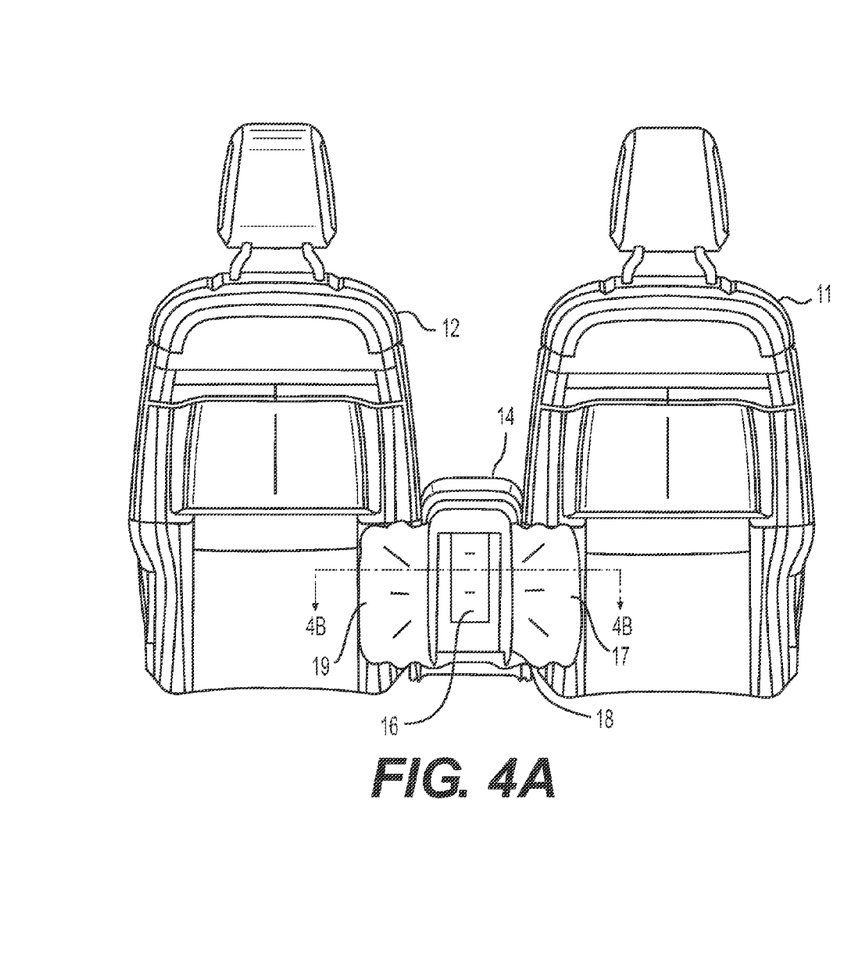
FIG. 4A is a perspective view of the console with impact absorbing device in the deployed position.
Figure 4B:
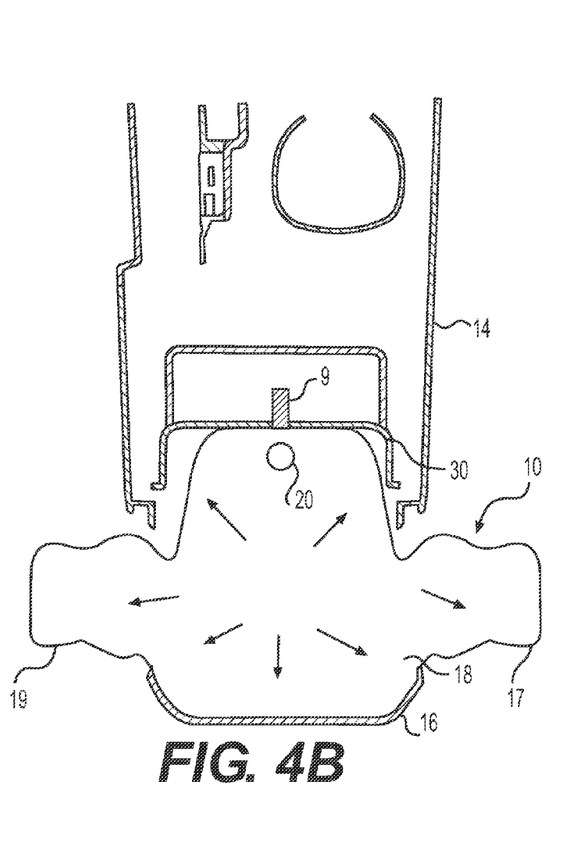
FIG. 4B is a cross-sectional view of the console with the impact absorbing device in the deployed position and including a left wing chamber and a right wing chamber.
Figure 7:
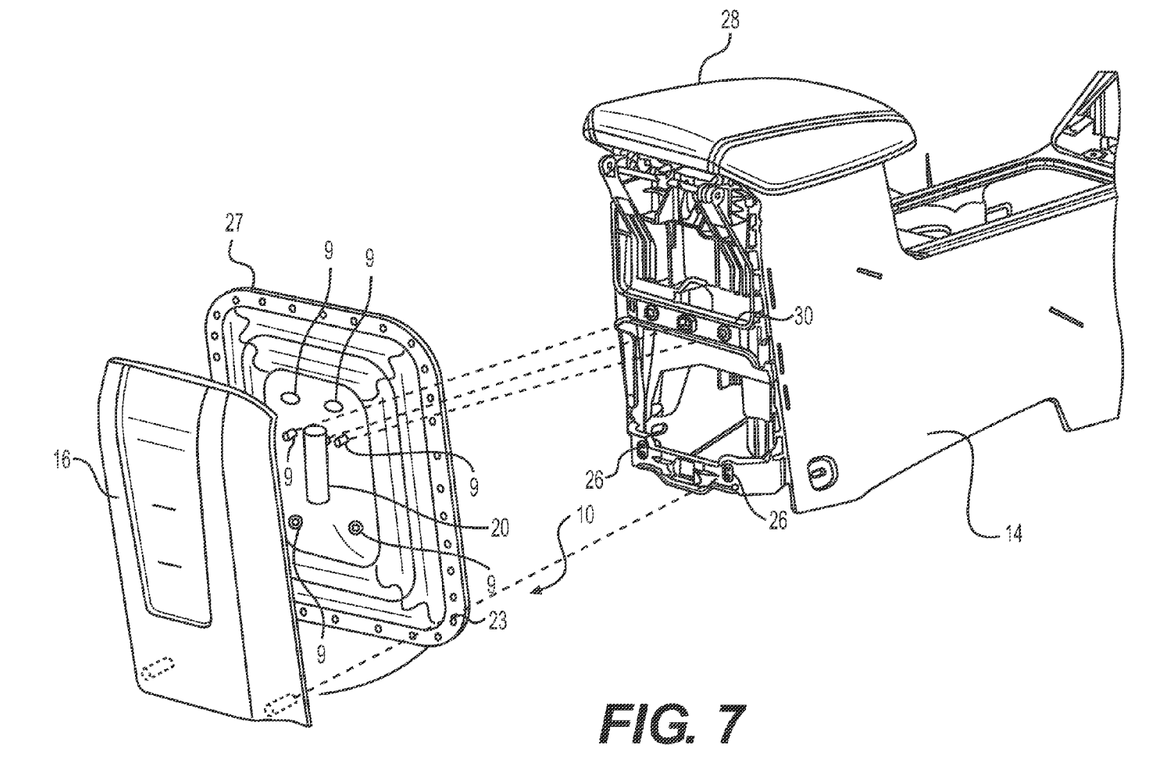
FIG. 7 is a partially exploded view of the impact absorbing device and a frame of the console.

As set forth above, the inflator 20 may be in communication with the inflation chamber 18. For example, the inflator 20 may be positioned inside the inflation chamber 18 to inflate the inflation chamber 18 as shown in FIGS. 3B, 4B and 7. Alternatively, the inflator may be disposed remotely from the inflation chamber 18 and connected to the inflation chamber in any suitable fashion, e.g., an inflation tube (not shown). Alternatively, the inflator 20 may inflate the inflation chamber 18 through a manifold (not shown). Alternatively, the inflator 20 may be partially disposed inside the inflation chamber 18.

The inflator 20 and/or the bladder 21 may be connected to the frame 30 with one or more mounting screws 9. For example, the mounting screws 9 may connect both the inflator 20 and the bladder to the frame 30, as shown in the figures. In another example, the inflator 20 may be fixed to the bladder 21 and the bladder 21 may be connected to the frame 30 with one or more mounting screws 9. As another example, the bladder 12 may be fixed to the inflator 20 and the inflator 20 may be connected to the frame 30 with one or more mounting screws 9. The mounting screws 9 may be releasably attached to both the bladder 21 and the frame 30 or may be permanently fixed to one of the bladder 21 or the frame 30, e.g., may be studs.

With reference to FIGS. 3B, 3C, 4B, 6B-C, and 7, the bladder 21 may be disposed between the inflator 20 and the frame 30. In such a configuration, a mounting screw 9 may extend from the inflator 20, through the bladder 21, to the frame 30. The bladder 21 may be pinched between the inflator 20 and the frame 30.

With reference to FIGS. 3B and 7, the console 14 includes retention features between the panel 16 and the frame 30. The retention features may be configured to selectively fix the panel 16 relative to the frame 30 in the stowed position and may be configured to release the panel 16 relative to the frame 30 when the inflator 20 inflates the inflation chamber 18. For example, the retention features may be snapping features configured to releasably engage the panel 16 and the frame 30. The snapping features may include mechanical features that releasably engage each other, e.g., snaps, resilient features, etc. As shown in FIGS. 3B and 7, the snapping features may include an opening 26 in one of the frame 30 and the panel 16 and post including a resilient finger 26 on the other of the frame 30 and the panel 16.

Figure 3C:
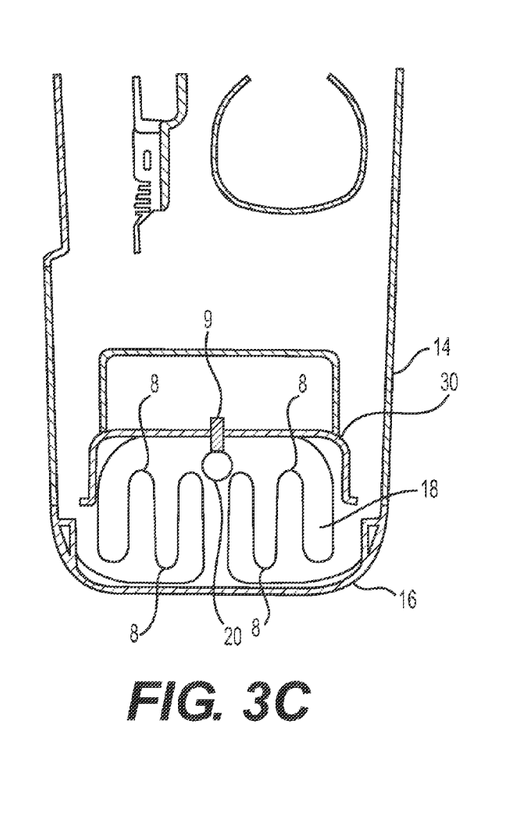
FIG. 3C is a cross-sectional view of the impact absorbing device in the stowed position along line 3C of FIG. 3A.
Figure 6A:
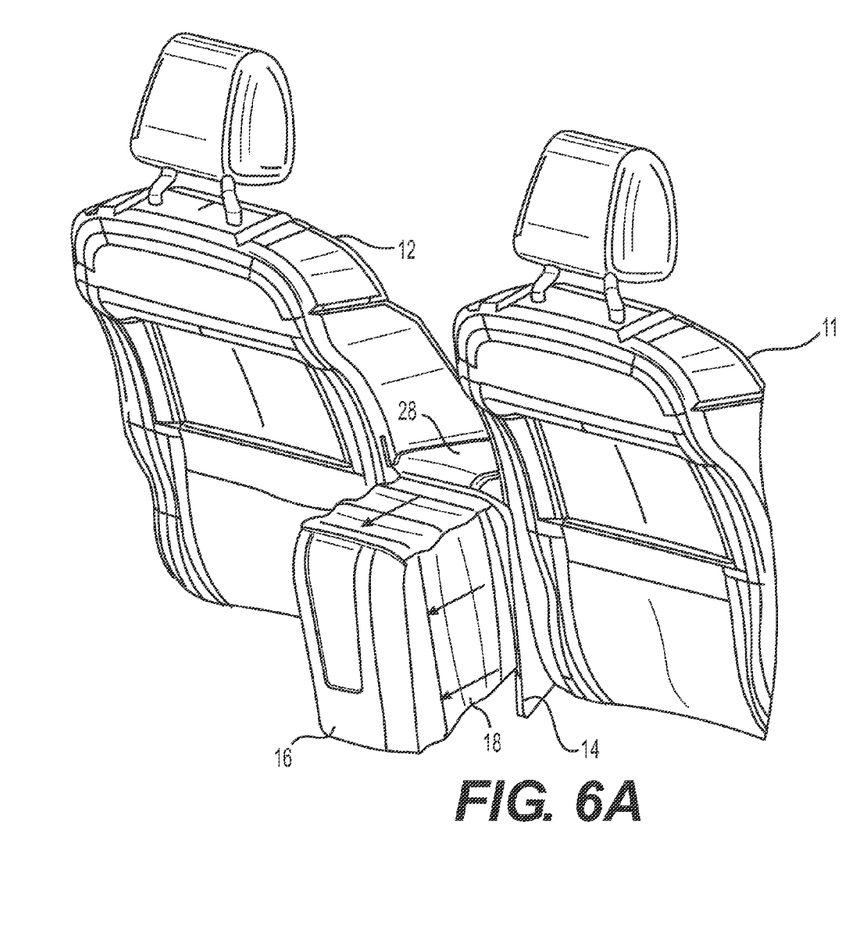
FIG. 6A is a perspective view of the console of including an impact absorbing device of another embodiment in the deployed position.
Figure 6B:
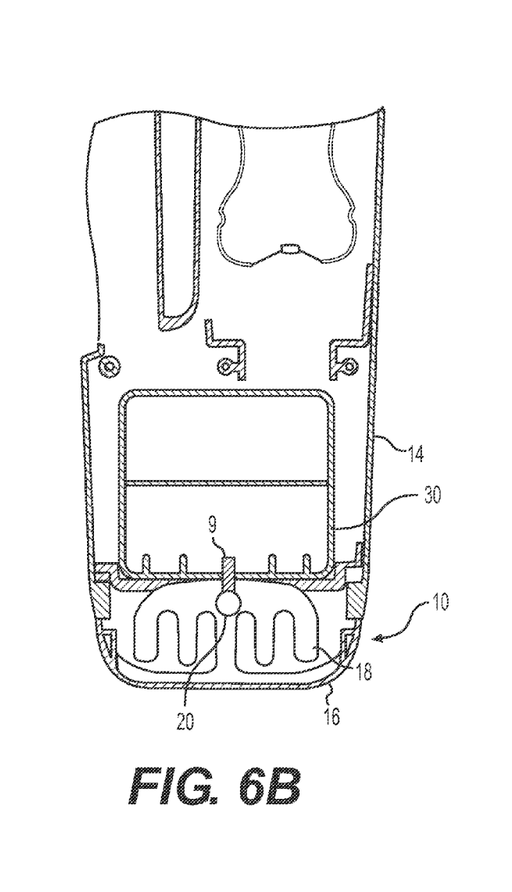
FIG. 6B is a cross-sectional view of the console of FIG. 6A including the impact absorbing device in the undeployed position.
Figure 6C:
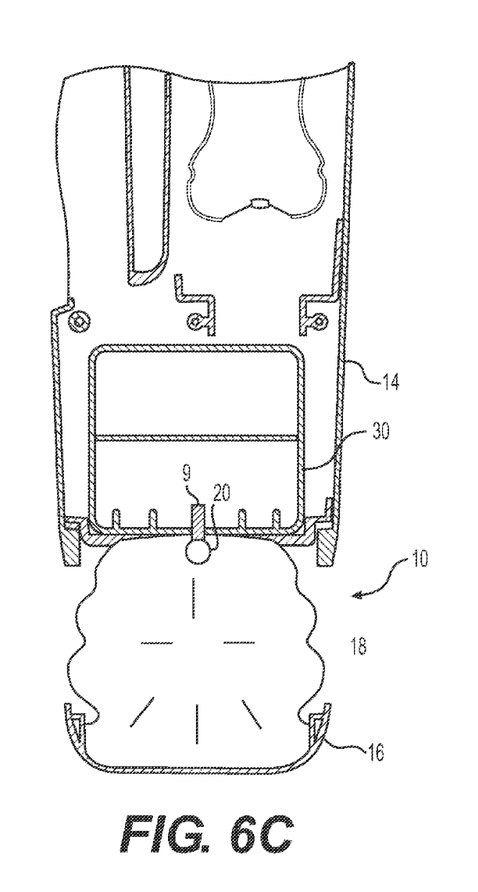
FIG. 6C is a cross-sectional view of the impact absorbing device of FIG. 6A in the deployed state.

In the stowed position, the bladder 21 may be folded between the frame 30 and the panel 16. For example, one embodiment of the folded configuration is shown in FIGS. 3B-C, another embodiment of the folded configuration is shown in FIGS. 6B-C, and another embodiment of the folded configuration is shown in FIG. 7. When folded in the stowed position, the bladder 21 may include one or more folds 8 to package the bladder 21 between the frame 30 and the panel 16, as shown in FIGS. 3B, 3C and 7. The folds 8 of the bladder 21 may be round or, alternatively, may be of any suitable configuration. The rounding of the fold 8 facilitate the deployment of the inflation chamber 18 and help relieve stress on the fold 8.

Figure 5:
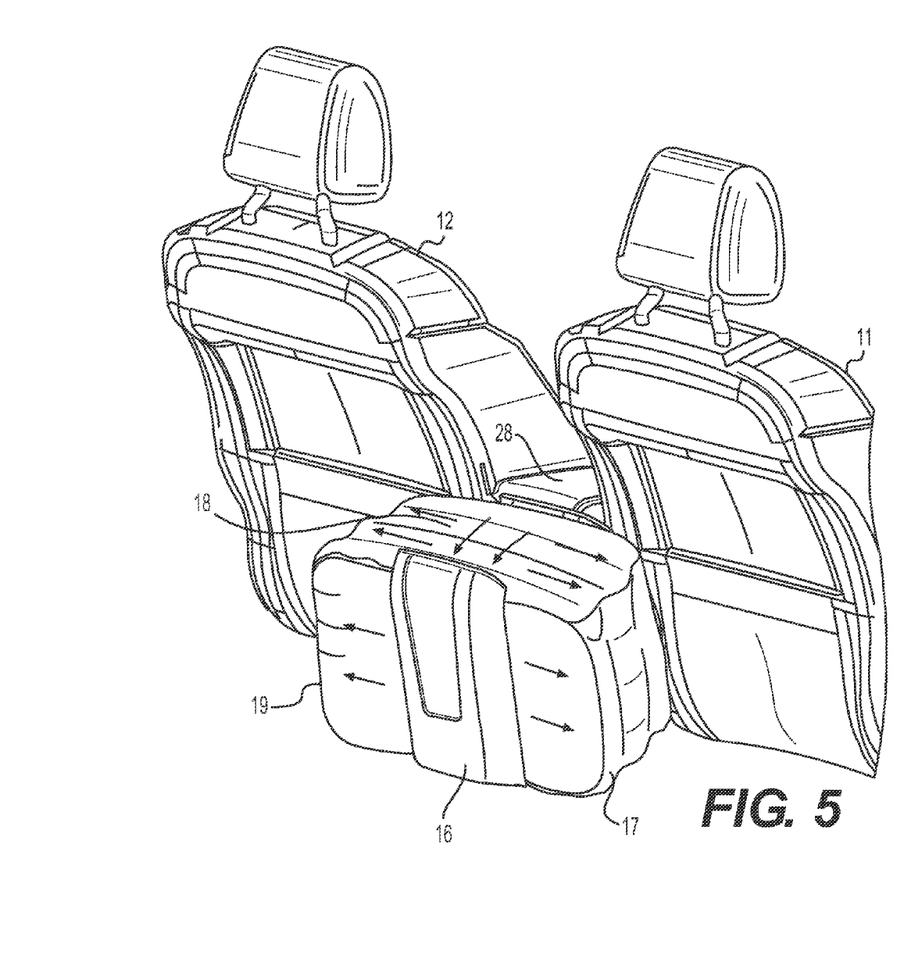
FIG. 5 is a perspective view of the impact absorbing device of FIGS. 4A-B.

The bladder 21 may be designed have any suitable shape when inflated to the extended position. For example, one embodiment of the shape of the bladder 21 is shown in FIGS. 4A-5. Another embodiment of the shape of the bladder is shown in FIG. 6A.

Specifically, as shown in FIGS. 4A-5, the bladder 21 may include one or more wing chambers, such as a left wing chamber 19 and a right wing chamber 17. These wing chambers 17, 19 may provide a larger surface area. Such a configuration may accommodate, for example, a large vehicle in which the span between the left front seat 12 and right front seat 11 may be voluminous Now with reference to FIG. 6A, the bladder 21 may extend directly rearwardly from the frame 30, i.e., may not include wing chambers. Such a configuration may be suitable for smaller vehicles where the span between the front seat 12 and right front seat 11 is relatively small.

Figure 8:
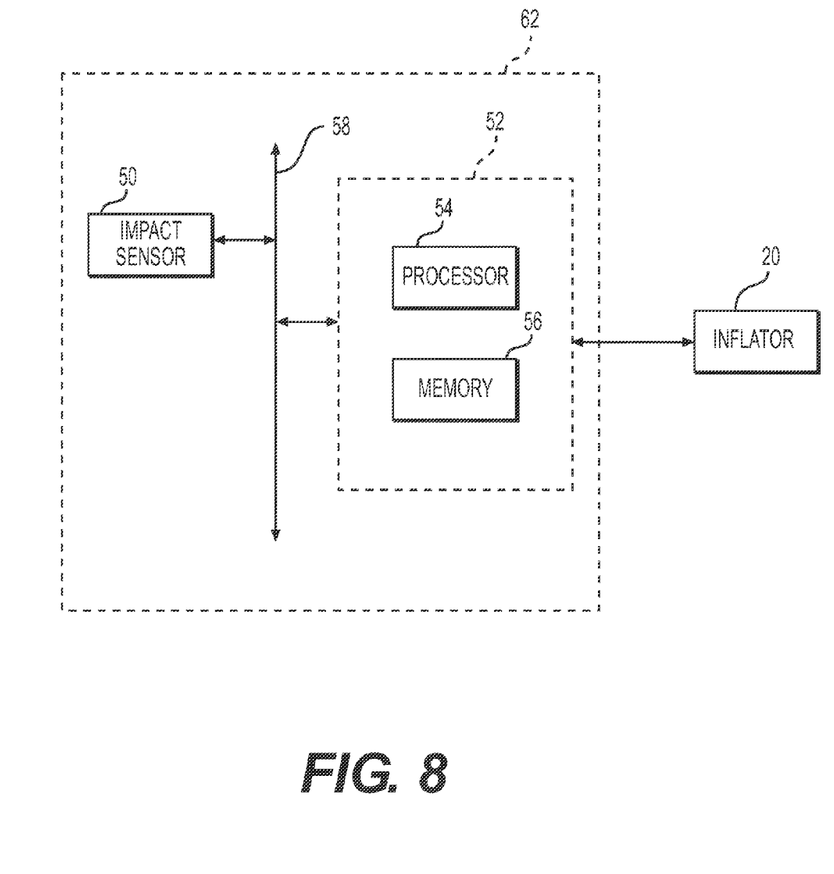
FIG. 8 is a block diagram of the inflator and an impact sensing system.

With reference to FIG. 8, the vehicle may include an impact sensing system 62. The impact sensing system 62 may include an impact sensor 50 and a controller 52. The controller 52 is in communication with the inflator 20 and may include a processor 54 and a memory 56, as shown in FIG. 8. The memory 56 stores instructions executable by the processor 54 to control the inflator 20. The controller 52 may be programmed to, upon identification of impact information provided by the impact sensor 50, cause triggering of the inflator 20.

The impact sensor 50 may be of an accelerometers, for example, a piezoelectric type, a piezoresistive type, a capacitive type or a micro electro-mechanical systems (MEMS) type or any type which detects a sudden deceleration. The impact sensor may also be a radar sensor which uses radio waves to determine a proximity and a speed of an object relative to the impact sensor 50. Additionally, the impact sensor may be a LIDAR sensor which utilizes light waves to achieve the same functionality as the radar system. Furthermore, the impact sensor 50 may be a vision sensor which may include one or more cameras, CCD image sensors, and/or CMOS image sensors to detect a nearing object.

Communications between the controller 52, the impact sensor 50, the inflator 20, and or other components in or around the vehicle, may be connected to a communication bus 58, such as a controller area network (CAN) bus, of the vehicle. The controller 52 may use information from the communication bus 58 to control the triggering of the inflator 20. The inflator 20 may be connected to the controller 52 or may be connected to the communication bus 58.

In a collision, the impact sensing system 62 or any other collision detecting system will detect a crash. The impact sensor 50 data is read by the impact sensing system 62 and will determine that a crash is occurring. The impact sensing system 62 will then instruct the inflator 20 to activate. When activated, the inflator 20 will cause the inflation chamber 18 to inflate and expand, as shown in FIG. 4B or in FIG. 6A and may absorb kinetic energy of the occupant 13.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle console comprising:
   a frame;
   an impact absorbing device including a bladder connected to the frame and a panel connected to the bladder defining an inflation chamber between the bladder and the panel, the panel being rigid relative to the bladder and the bladder being disposed between the panel and the frame; and
   an inflator in communication with the inflation chamber the impact absorbing device being inflatable from a stowed position to an extended position, the panel abutting the frame in the stowed position and spaced from the frame in the extended position.

2. The vehicle console of claim 1, wherein the bladder is thinner than the panel.

3. The vehicle console of claim 1, wherein the panel and the bladder are integrally formed.

4. The console of claim 1, wherein the panel and the bladder are hermetically sealed.

5. The vehicle console of claim 1, wherein bladder is welded to the panel.

6. The vehicle console of claim 1, wherein the panel is substantially flush with the console in the stowed position.

7. The vehicle console of claim 6, wherein the panel encloses the bladder in the stowed position.

8. The vehicle console of claim 1, wherein the panel presents a class-A surface.

9. The vehicle console of claim 1, wherein inflator is configured to inflate the inflation chamber to move the panel away from the frame from the stowed position to the extended position.

10. The vehicle console of claim 9, further comprising retention features between the panel and the frame and configured to selectively fix the panel relative to the frame in the stowed position and to release the panel relative to the frame when the inflator inflates the inflation chamber.

11. The vehicle console of claim 1, wherein one of the panel and the frame includes snapping features configured to releasably engage the panel and the frame.

12. The vehicle console of claim 1, wherein the inflator is disposed inside the inflation chamber.

13. The vehicle console of claim 12, wherein the inflator is attached to the frame.

14. The vehicle console of claim 1, wherein the bladder is folded between the frame and the panel.

15. The vehicle console of claim 1, wherein the bladder is silicon.

16. The vehicle console of claim 15, wherein the panel is plastic.

17. The vehicle console of claim 1, wherein the bladder and the panel are formed of the same type of material.

18. The vehicle console of claim 1, wherein the bladder has a uniform thickness.

19. The vehicle console of claim 1, wherein the panel moves in a vehicle-rearward direction from the stowed position to the extended position, and wherein the bladder includes a wing chamber extending from panel in a cross-vehicle direction transverse to the vehicle-rearward direction in the extended position.

* * * * *